United States Patent [19]

Toda

[11] Patent Number: 4,956,723
[45] Date of Patent: Sep. 11, 1990

[54] RECORDING APPARATUS WITH SHEET SIZE SELECTION

[75] Inventor: Kozo Toda, Yokohama, Japan

[73] Assignee: Canon Kabushiki Kaisha, Tokyo, Japan

[21] Appl. No.: 441,205

[22] Filed: Nov. 28, 1989

Related U.S. Application Data

[63] Continuation of Ser. No. 303,060, Jan. 30, 1989, abandoned, which is a continuation of Ser. No. 156,889, Feb. 17, 1988, abandoned.

[30] Foreign Application Priority Data

Feb. 26, 1987 [JP] Japan .................................. 62-44350

[51] Int. Cl.$^5$ ............................................. H04N 1/00
[52] U.S. Cl. ..................................... 358/449; 358/400
[58] Field of Search ............... 358/486, 488, 494, 496, 358/498, 449

[56] References Cited

U.S. PATENT DOCUMENTS

| | | | |
|---|---|---|---|
| 3,885,869 | 5/1975 | James | 355/311 |
| 4,249,216 | 2/1981 | Kanda | 358/257 |
| 4,439,790 | 3/1984 | Yoshida | 358/257 |
| 4,506,302 | 3/1985 | Kurata | 358/293 |
| 4,583,124 | 4/1986 | Tsuji et al. | 358/257 |
| 4,694,352 | 9/1987 | Ina et al. | 358/257 |
| 4,704,636 | 11/1987 | Yano | 358/257 |
| 4,711,556 | 12/1987 | Abuyama | 355/311 |
| 4,731,658 | 3/1988 | Koseki | 358/257 |

FOREIGN PATENT DOCUMENTS 2160386A 12/1985 United Kingdom ................ 358/449

Primary Examiner—Edward L. Coles, Sr.
Assistant Examiner—Jerome Grant
Attorney, Agent, or Firm—Fitzpatrick, Cella, Harper & Scinto

[57] ABSTRACT

There is disclosed a facsimile apparatus or the like with plural feeding units for feeding sheets of different sizes, in which a sheet of smaller size is automatically selected for recording information necessary for monitoring the functioning of the apparatus, thereby avoiding unnecessary consumption of recording sheets.

7 Claims, 4 Drawing Sheets

RECORDING APPARATUS WITH SHEET SIZE SELECTION

This application is a continuation-in-part of application Ser. No. 303,060 filed Jan. 30, 1989, now abandoned, which is a continuation of application Ser. No. 07/156,889, filed Feb. 17, 1988, now abandoned.

BACKGROUND OF THE INVENTION

1. Field of the Invention

The present invention relates to a recording apparatus provided with plural sheet feeding units.

2. Related Background Art

In recording apparatus such as a facsimile apparatus, various information required for monitoring the function of said apparatus, such as time, duration and destination of communication, are often stored in a memory in the apparatus and can be retrieved by the operator for confirmation.

In a conventional apparatus with only one sheet feeding unit, such information is taken out from said memory and is usually printed on a recording sheet which is stored for recording the image received by facsimile communication, using the same recording method as is used in facsimile reception.

However, such a large recording sheet is in fact unnecessary for informing the operator of such monitoring information. Also the use of recording sheet for such purpose is undesirable as the recording sheets usable for facsimile reception are wasted.

There has also been proposed a facsimile apparatus having a sheet feeding unit exclusively for recording such monitoring information, but the presence of such exclusive sheet feeding unit complicates the structure and elevates the cost of the apparatus.

SUMMARY OF THE INVENTION

In consideration of the foregoing, an object of the present invention is to provide an improved recording apparatus.

Another object of the present invention is to provide a recording apparatus capable of preventing unnecessary consumption of recording sheets.

Still another object of the present invention is to provide a recording apparatus capable of reducing the running cost.

Still another object of the present invention is to provide a recording apparatus capable of recording received images on recording sheets of two different sizes and selecting sheet sizes according to the information to be recorded.

Still another object of the present invention is to provide a recording apparatus having recording sheets of two different sizes for image recording, and selecting said sizes for the recording of received image and for the recording of monitoring information, thus printing said monitoring information preferentially on the recording sheet of smaller size.

The foregoing and still other objects, features and advantages of the present invention will become fully apparent from the following description to be taken in conjunction with the attached drawings.

DETAILED DESCRIPTION OF THE PREFERRED EMBODIMENTS

Now the present invention will be clarified in detail by the embodiments thereof shown in the attached drawings.

Figure 1:
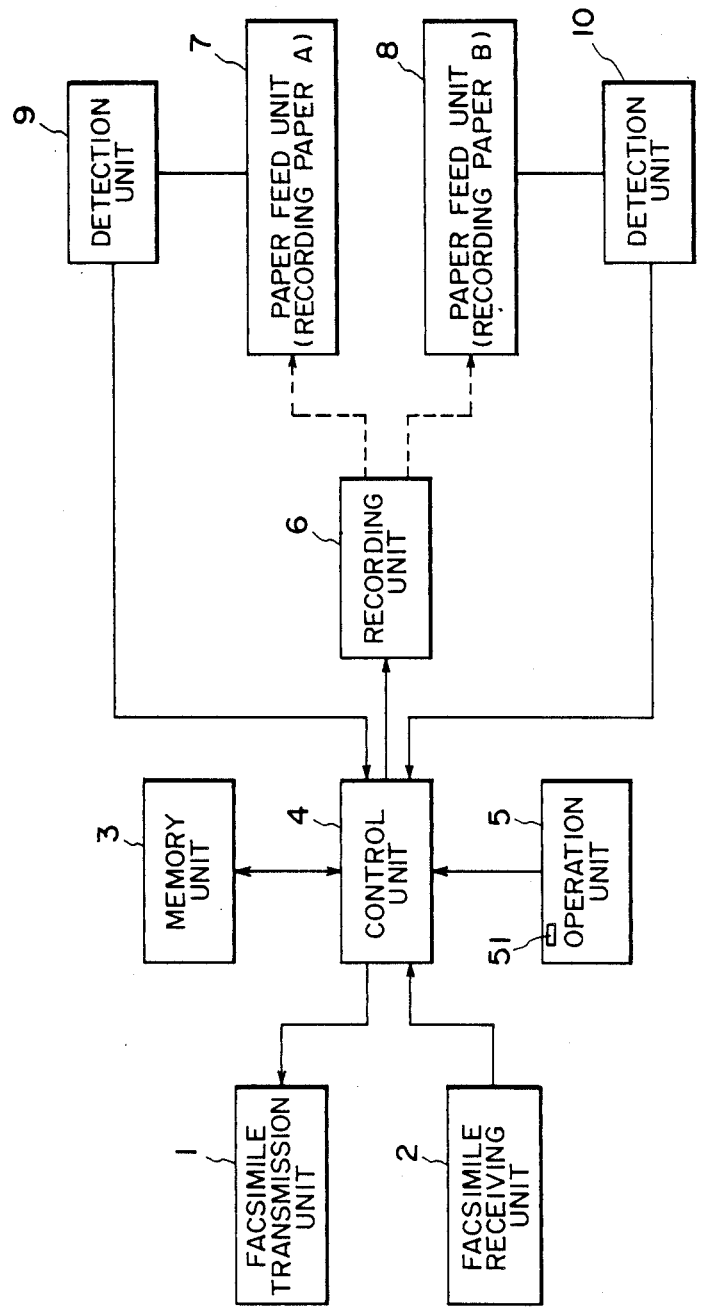
FIG. 1 is a block diagram of a recording apparatus embodying the present invention.

FIG. 1 is a block diagram of a facsimile apparatus embodying the present invention.

In FIG. 1, there are provided a transmission unit 1 for facsimile transmission of an image; a receiving unit 2 for facsimile reception of an image; a memory unit 3 for storing various information necessary for or resulting from facsimile communication such as the parameters for communication, telephone numbers of destinations of communication, times of communication, periods required for communication, data indicating whether the text was properly received, reason for an incomplete communication, etc.; a control unit 4 composed principally of a known microcomputer for controlling various units of the apparatus; an operation unit 5 having various keys and displays for enabling the operator to operate the apparatus; a recording unit 6 for recording a received image or a communication monitoring report on a recording sheet; a sheet feeding unit 7 for feeding the recording sheet of a large size for recording an image received by facsimile communication; a sheet feeding unit 8 for feeding a recording sheet of a small size for recording an image received by facsimile communication, said unit being preferentially selected in the recording of a communication monitoring report; a detection unit 9 for detecting the presence or absence of the recording sheet of large size; and a detection unit 10 for detecting the presence or absence of the recording sheet of small size.

In the present embodiment the recording sheets of two different sizes are provided for recording the received image, and the information for monitoring the function of the facsimile apparatus, other than the received image, is preferentially recorded on the recording sheet of the smaller size.

In a case of facsimile communication with the above-explained apparatus, the received image data are received by the receiving unit 2, then supplied to the recording unit 6 and, according to the descrimination by the control unit 4, recorded on the recording sheet of larger size A from the feeding unit 7 or the recording sheet of smaller size B from the feeding unit 8. Said discrimination is made by size data sent from the sender prior to the image data.

On the other hand, when the operator requests a communication monitoring report through the operation unit 5, necessary data are obtained from the memory unit 3 under the instruction of the control unit 4, then sent to the recording unit 6 and recorded on the recording sheet B of smaller size from the feeding unit 8.

Figure 2:
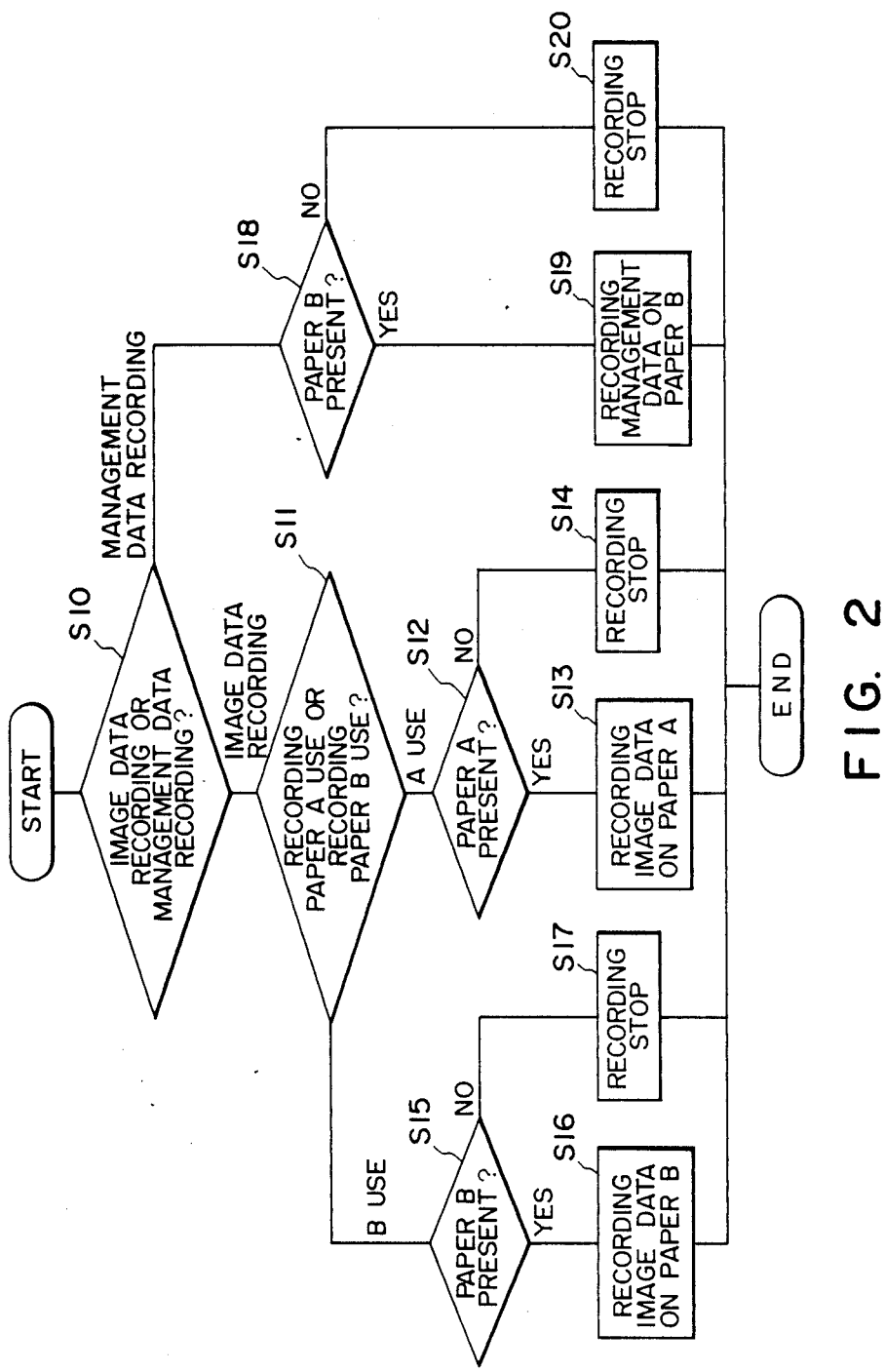
FIG. 2 is a flow chart showing a control sequence to be executed by a control unit shown in FIG. 1.

FIG. 2 is a flow chart showing the control sequence to be executed by the control unit 4. In the following there will be explained the function of the present embodiment while making reference to said flow chart.

At first a step S10 discriminates whether the requested recording operation is for recording image data obtained by facsimile communication or for recording the monitor data of the facsimile apparatus requested by the operator through the actuation of a key 51 of the operation unit 5.

In the former case, a step S11 selects a suitable sheet size, either the large-sized sheet A or the small-sized sheet B according to the size of the original document, transmitted from the sender prior to the image data.

If the step S11 selects the large-sized sheet A, a step S12 causes the detection unit 9 to discriminate the presence of sheet A in the feeding unit 7, and, if present, a step S13 selects the feeding unit 7 for recording the image data, received by the receiving unit 2, on the large-sized recording sheet A, and causes the recording unit 6 to effect a recording operation on the recording sheet A supplied from said feeding unit.

On the other hand, if the step S12 identifies the absence of the recording sheet A, a step S14 terminates the recording operation.

On the other hand, if the step S11 selects the recording sheet B, a step S15 causes the detection unit 10 to discriminate the presence of sheet B in the feeding unit 8, and, if present, a step S14 selects the feeding unit 8 for recording the received image data on the small-sized recording sheet B and causes the recording unit 6 to effect a recording operation on the recording sheet B supplied from said feeding unit.

If the step S15 identifies the absence of the recording sheet B, the recording operation is interrupted in a step S17.

On the other hand, if a record of the monitor data of the facsimile apparatus is requested in the step S10, a step S18 causes the detection unit 10 to discriminate the presence or absence of the small-sized recording sheet B in the feeding unit 8, and, if present, a step S19 selects the feeding unit 8, reads the monitor data from the memory unit 3 and records said monitor data thus obtained on the recording sheet B.

If the step S18 identifies the absence of the recording sheet B, the recording operation is terminated in a step S20.

In the following there will be explained another embodiment of the present invention. In this embodiment, both the large-sized recording sheet A and the small-sized recording sheet B can be used for recording the received image data, and said recording sheet A or B is selected in response to the size data transmitted from the sender prior to the image data. The monitor data are recorded preferentially on the small-sized recording sheet B, but they are recorded on the large-sized recording sheet A if the recording sheet B is absent.

Figure 3:
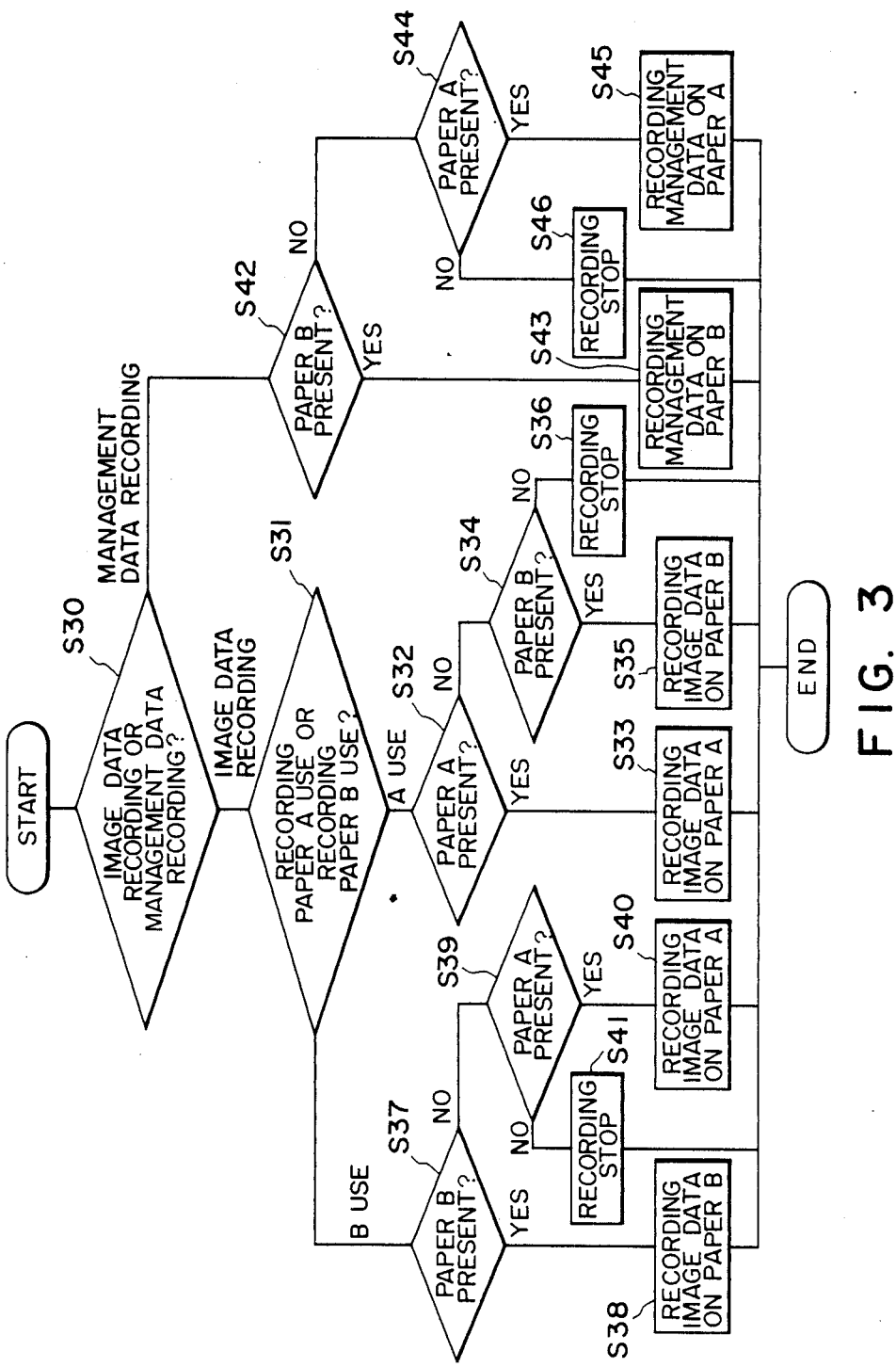
FIG. 3 is a flow chart showing a control sequence of another embodiment.

FIG. 3 is a flow chart showing the control sequence of this embodiment.

At first a step S30 discriminates whether the requested recording operation is for recording image data obtained by facsimile communication or for recording the monitor data of the facsimile apparatus requested by the operator through the actuation of a key 51 of the operation unit 5.

In the former case, a step S31 selects a suitable sheet size, i.e., either the large-sized sheet A or the small-sized sheet B, according to the size of the original document, transmitted from the sender prior to the image data.

In case the step S31 selects the large-sized recording sheet A, a step S32 causes the detection unit 9 to discriminate the presence or absence of the recording sheet A in the feeding unit 9, and, if present, a step S33 selects the feeding unit 7 for recording the image data, received by the receiving unit 2, and causes the recording unit 6 to effect a recording operation on the recording sheet A supplied from said feeding unit.

If the step S32 identifies the absence of the recording sheet A, a step S34 causes the detection unit 10 to discriminate the presence or absence of the recording sheet B in the feeding unit 8, and, if present, a step S35 selects the feeding unit 8 for recording the image data, received by the receiving unit 2, on the recording sheet B, and causes the recording unit 6 to effect a recording operation on the recording sheet B supplied from said feeding unit. In this case, the image size is reduced since the recording is made on the small-sized recording sheet B instead of the large-sized recording sheet A. On the other hand, if the step S34 identifies the absence of the recording sheet B, the recording operation is terminated in a step S36 since neither the recording sheet A nor the recording sheet B is present in this case.

On the other hand, if the step S31 selects the recording sheet B, a step S37 causes the detection unit 10 to discriminate the presence or absence of the recording sheet B in the feeding unit 8, and, if present, a step S38 selects the feeding unit 8 for recording the received image data on the recording sheet B, and causes the recording unit 6 to effect a recording operation on the recording sheet B supplied from said feeding unit.

If the step S37 identifies the absence of the recording sheet B, a step S39 causes the detection unit 9 to discriminate the presence or absence of the recording sheet A in the feeding unit 7, and, if present, a step S40 selects the feeding unit 7 for recording the received image data on the recording sheet A and causes the recording unit 6 to effect a recording operation on the recording sheet A supplied from said feeding unit. In this case the image is recorded only in a part of the recording sheet A since the recording is made on the large-sized recording sheet A instead of the small-sized recording sheet B. The recorded image may be enlarged if an image enlarging function is available.

If the step S39 identifies the absence of the recording sheet A, the recording operation is terminated in a step S41, since neither the recording sheet A nor the recording sheet B is available in this case.

On the other hand, a report of the monitor data of the facsimile apparatus is requested in the step S30, a step S42 causes the detection unit 10 to discriminate the presence or absence of the small-sized recording sheet B in the feeding unit 8, and, if present, a step S43 selects the feeding unit 8, reads the monitor data from the memory unit 3 and so controls the recording unit 6 as to record said monitor data thus read on the recording sheet B.

If the step S42 identifies the absence of the recording sheet B, a step S44 causes the detection unit 9 to discriminate the presence or absence of the recording sheet A in the feeding unit 7, and, if present, a step S45 selects the feeding unit 7 and records the monitor data, read from the memory unit 3, on the recording sheet A. In this case, said monitor data are recorded only in a part of the recording sheet A, since the small-sized recording sheet B is replaced by the large-sized recording sheet A. Said monitor data may be recorded in an enlarged size if an image enlarging function is available.

If the step S44 identifies the absence of the recording sheet A, the recording operation is terminated in a step S46, since neither the recording sheet A nor the recording sheet B is available in this case.

Figure 4:
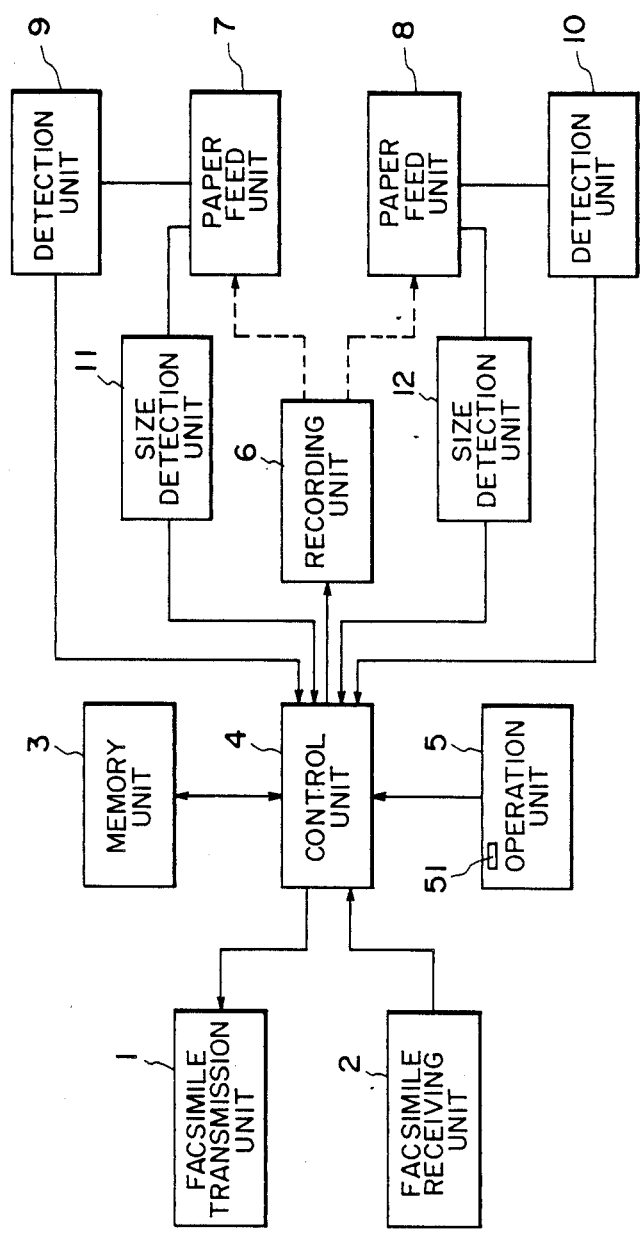
FIG. 4 is a block diagram of a recording apparatus constituting another embodiment of the present invention.

FIG. 4 is a block diagram of still another embodiment, in which components the same as those in FIG. 1 are represented by the same numbers. There are further shown a size detection unit 11 for detecting the size of the recording sheets set in &he feeding unit 7, and a size detection unit 12 for detecting the size of the recording sheets set in the feeding unit 8.

In this embodiment each of the feeding units 7, 8 can accommodate the large-sized recording sheet or the small-sized recording sheet, and, for this reason, the size detection units 11, 12 are provided for detecting the size of the recording sheets set in said feeding units.

The control sequence in this embodiment is almost the same as in the foregoing embodiments, except that, in the selection of the recording sheet in the steps S10, S11, the control unit 4 identifies the outputs of the size detection units 11, 12 and selects the feeding unit 7 or 8 according to said outputs.

The recording sheet may be a cut sheet or a rolled sheet.

If a cut sheet is used, the recording of the monitor data may be conducted after a predetermined amount of monitor data is accumulated in the memory unit 3.

In such case, if a report is requested before the accumulation of said predetermined amount of monitor data, such report may be given on a display unit.

Although the foregoing embodiments have been limited to facsimile apparatus, the present invention is not limited thereto.

The present invention aims at an information recording apparatus capable of selecting the recording sheet according to the information to be recorded, thereby avoiding the waste thereof and improving the economy of the apparatus, and is therefore applicable to any apparatus provided therein with a memory unit and a recording unit and having a function of informing the operator of data in printed form.

I claim:
1. A recording apparatus comprising:
   first sheet feeding means for feeding a large size of recording sheet;
   first detection means for detecting the presence or absence of a sheet in said first sheet feeding means;
   second sheet feeding means for feeding a small size of recording sheet;
   second detection means for detecting the presence or absence of a sheet in said second sheet feeding means;
   communication means for data communication;
   recording means for recording image data received from said communication means or communication monitoring data; and
   selection means for selecting either one of said first and second sheet feeding means, in the recording of the received image data, in accordance with size data transmitted to said communication means prior to said image data, and for selecting said second sheet feeding means in the recording of said communication monitoring data, said selection means selecting said first sheet feeding means in the recording of said communication monitoring data when said second detection means detects the absence of a sheet and said first detection means detects the presence of a sheet.

2. A recording apparatus according to claim 1, wherein said selection means is adapted, in the recording of the received image data, if either said first or second detection means detects the absence of the recording sheet in either sheet feeding means selected in accordance with said size data, to select the other sheet feeding means.

3. A recording apparatus according to claim 2, wherein said selection means is adapted to control said recording means so that if said other detection means detects the absence of the recording sheet in said other sheet feeding means, the recording of the received image data is interrupted.

4. A recording apparatus according to claim 1, wherein said selection means is adapted, if said first detection means detects the absence of a sheet in said first sheet feeding means, to control said recording means so as to interrupt the recording operation of the communication monitoring data.

5. A recording apparatus according to claim 1, further comprising memory means for storing and communicating monitoring data.

6. A recording apparatus comprising:
   first and second sheet feeding means for storing and feeding different sized recording sheets, respectively;
   first detection means for detecting the size of the recording sheets stored in said first sheet feeding means;
   second detection means for detecting the size of the recording sheets stored in said second sheet feeding means;
   communication means for data communication;
   recording means for recording image data received by said communications means or communication monitoring data; and
   size detection means for detecting the size of the recording sheets set in said first and second sheet feeding means; and
   selection means for selecting, in the recording of said image data, either one of said first or said second sheet feeding means in accordance with (1) size data transmitted to said communication means prior to said image data, and (2) output data of said first and second detection means, and for selecting, in the recording of the communication monitoring data, either one of said first or said second sheet feeding means which is detected to have a smaller size sheet by said first and second detection means.

7. A recording apparatus according to claim 6, wherein said communication monitoring data are for monitoring functions of the apparatus.

* * * * *

UNITED STATES PATENT AND TRADEMARK OFFICE
CERTIFICATE OF CORRECTION

PATENT NO. : 4,956,723
DATED : September 11, 1990
INVENTOR(S) : KOZO TODA

It is certified that error appears in the above-identified patent and that said Letters Patent is hereby corrected as shown below:

COLUMN 1

Line 5, "continuation-in-part" should read --continuation--.
    Line 29, "recording" should read --a recording--.

COLUMN 4

Line 37, "only.in" should read --only on--.

COLUMN 5

Line 7, "&he" should read --the--.

COLUMN 6

Line 27, "and commu-" should read --said communication--.
    Line 28, "nicating" should be deleted.
    Line 42, "communications means" should read --communication means--.

UNITED STATES PATENT AND TRADEMARK OFFICE
CERTIFICATE OF CORRECTION

PATENT NO. : 4,956,723

DATED : September 11, 1990

INVENTOR(S) : KOZO TODA

It is certified that error appears in the above-identified patent and that said Letters Patent is hereby corrected as shown below:

COLUMN 6

Line 58, "are for" should read --are data for--.

Signed and Sealed this

Thirteenth Day of April, 1993

Attest:

STEPHEN G. KUNIN

*Attesting Officer*    Acting Commissioner of Patents and Trademarks